US009298312B2

(12) United States Patent
Kuznetsov

(10) Patent No.: US 9,298,312 B2
(45) **Date of Patent: *Mar. 29, 2016**

(54) AUTOMATED PERCEPTUAL QUALITY ASSESSMENT OF TOUCHSCREEN DEVICES

(75) Inventor: Eugene Kuznetsov, Escondido, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/997,044

(22) PCT Filed: Feb. 15, 2012

(86) PCT No.: PCT/US2012/025282

§ 371 (c)(1), (2), (4) Date: Sep. 17, 2014

(87) PCT Pub. No.: WO2013/122586

PCT Pub. Date: Aug. 22, 2013

(65) Prior Publication Data

US 2015/0029107 A1 Jan. 29, 2015

(51) Int. Cl.

*G06F 3/041* (2006.01)
*G06F 3/0488* (2013.01)
*G06F 11/30* (2006.01)
*G09G 3/00* (2006.01)

(52) U.S. Cl.

CPC .............. *G06F 3/0418* (2013.01); *G06F 3/041* (2013.01); *G06F 3/0488* (2013.01); *G06F 11/302* (2013.01); *G09G 3/006* (2013.01)

(58) Field of Classification Search

CPC .................... G06F 3/041–3/047; G06F 3/005; G06F 3/017; G06F 2203/04101–2203/04113

USPC .......... 345/173–178; 179/18.01–18.09, 18.11

See application file for complete search history.

(56) References Cited

U.S. PATENT DOCUMENTS

| | | | |
|---|---|---|---|
| 5,566,291 | A | 10/1996 | Boulton et al. |
| 7,167,197 | B2 | 1/2007 | Hill et al. |
| 7,479,949 | B2 | 1/2009 | Jobs et al. |
| 2007/0176871 | A1 | 8/2007 | Tsai et al. |
| 2008/0091121 | A1 | 4/2008 | Sun et al. |

(Continued)

FOREIGN PATENT DOCUMENTS

| | | | |
|---|---|---|---|
| JP | 2002-291001 | A | 10/2002 |
| KR | 10-2006-0104722 | A | 10/2006 |

(Continued)

OTHER PUBLICATIONS

International Preliminary Report on Patentability and Written Opinion received for PCT Patent Application No. PCT/US2012/025282, mailed on Aug. 28, 2014, 5 Pages.

(Continued)

*Primary Examiner* — Stephen Sherman

(74) *Attorney, Agent, or Firm* — Jordan IP Law, LLC

(57) ABSTRACT

Methods and systems may provide for receiving a video of an interaction with a touch screen, using a computer vision process to identify a gesture in the video, and determining a response time of the touch screen with respect to the gesture. Moreover, a display area update percentage can be tracked subsequent to a response of the touch screen to the gesture, wherein a frame rate determination may be conducted for the touch screen based on the display area update percentage.

25 Claims, 3 Drawing Sheets

10
16
18
20
15
14
12

(56) References Cited

U.S. PATENT DOCUMENTS

| | | | | |
|---|---|---|---|---|
| 2009/0312009 | A1 | 12/2009 | Fishel | |
| 2010/0070542 | A1 | 3/2010 | Feinsmith | |
| 2010/0121866 | A1 | 5/2010 | Bell et al. | |
| 2011/0292288 | A1 | 12/2011 | Deever | |
| 2012/0146956 | A1 | 6/2012 | Jenkinson | |
| 2012/0188176 | A1 | 7/2012 | Uzelac et al. | |
| 2012/0280934 | A1 | 11/2012 | Ha et al. | |
| 2013/0002862 | A1 | 1/2013 | Waring et al. | |
| 2013/0194195 | A1* | 8/2013 | Parekh et al. | 345/173 |
| 2013/0197862 | A1* | 8/2013 | Uzelac et al. | 702/186 |

FOREIGN PATENT DOCUMENTS

| | | | |
|---|---|---|---|
| KR | 10-2006-0121330 | A | 11/2006 |
| KR | 10-2011-0077536 | A | 7/2011 |
| WO | 2011/161316 | A1 | 12/2011 |
| WO | 2013/003534 | A2 | 1/2013 |
| WO | 2013/003534 | A3 | 2/2013 |
| WO | 2013/122586 | A3 | 2/2013 |
| WO | 2013/122586 | A2 | 8/2013 |
| WO | 2013/122586 | A3 | 10/2013 |

OTHER PUBLICATIONS

International Search Report and Written Opinion received for PCT application No. PCT/US2012/044537, mailed on Dec. 18, 2012, 10 pages.

Office Action received for U.S. Appl. No. 13/174,052, mailed on Jul. 11, 2013, 13 pages.

International Search Report and Written Opinion received for PCT Patent Application No. PCT/US2012/025282, mailed on Aug. 23, 2013, 8 pages.

* cited by examiner

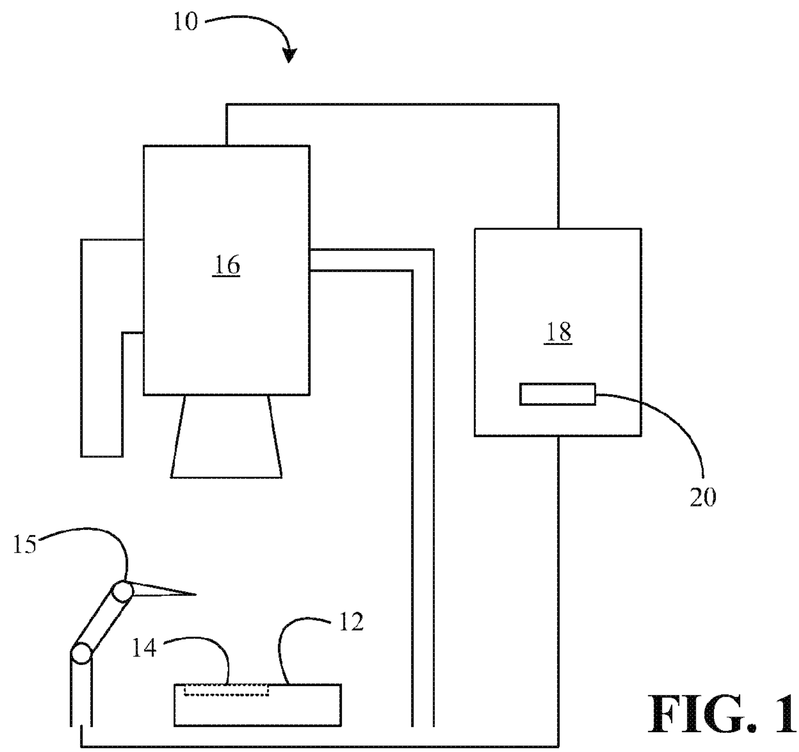
FIG. 1
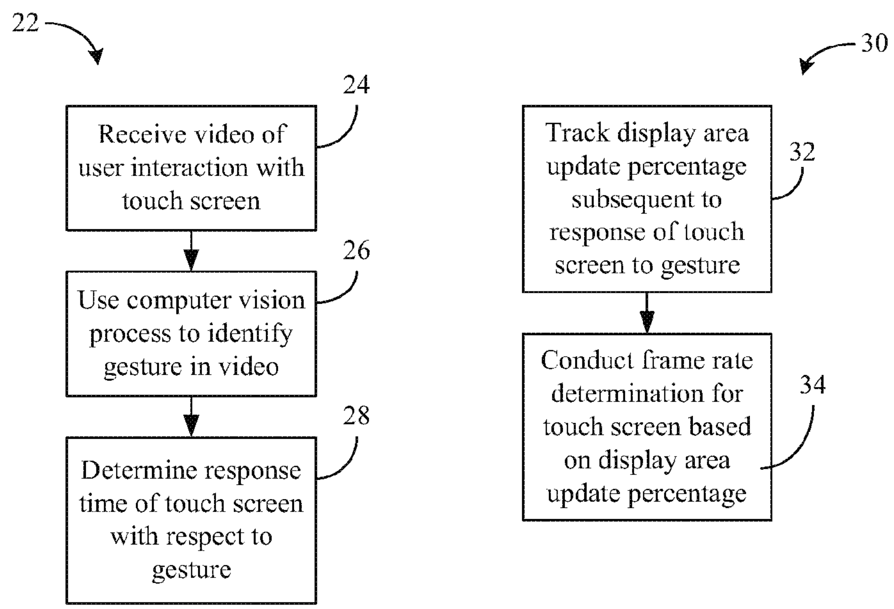
FIG. 2A
FIG. 2B

AUTOMATED PERCEPTUAL QUALITY ASSESSMENT OF TOUCHSCREEN DEVICES

CROSS-REFERENCE TO RELATED APPLICATIONS

The present application is related to U.S. patent application Ser. No. 13/174,052, filed on Jun. 30, 2011, now U.S. Pat. No. 8,823,794, issued on Sep. 2, 2014.

BACKGROUND

1. Technical Field

Embodiments generally relate to the evaluation of consumer electronics devices. More particularly, embodiments relate to automated perceptual quality assessments of touch screen devices.

2. Discussion

Conventional approaches to evaluating the effectiveness of touch screen devices may involve manually observing video captured of the device during manipulation in order to quantify parameters related to perceptual quality. Such an approach may provide sub-optimal and/or inaccurate assessment results.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a block diagram of an example of a measurement system according to an embodiment;

FIG. 2A is a flowchart of an example of a method of evaluating response times for a touch screen according to an embodiment;

FIG. 2B is a flowchart of an example of a method of evaluating frame rates for a touch screen according to an embodiment;

DETAILED DESCRIPTION

Figure 3:
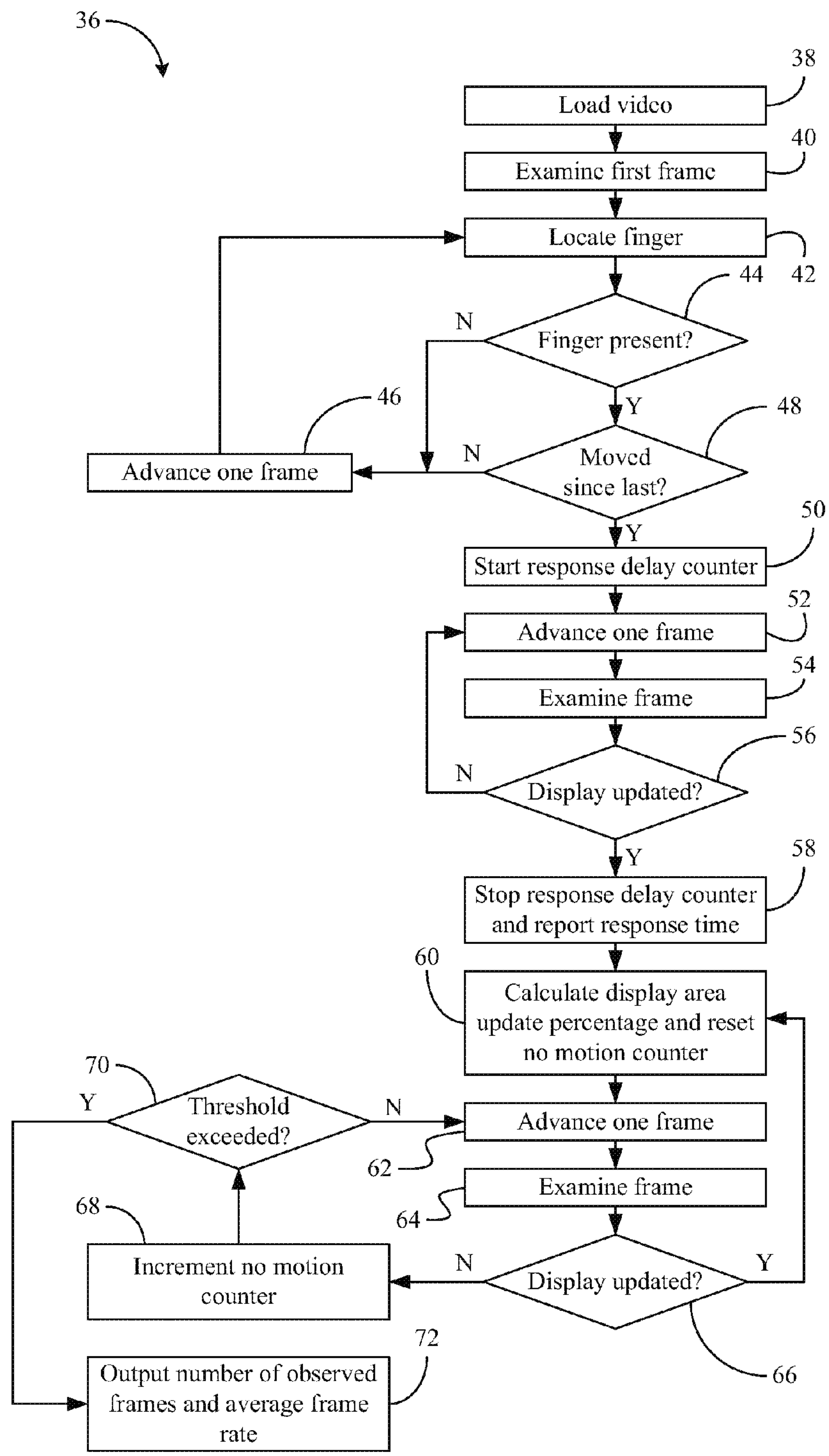
FIG. 3 is a flowchart of an example of a method of evaluating a touch screen according to an embodiment.

Embodiments may include a method in which a video of a computer interaction with a touch screen is received. The method may also provide for using a computer vision process to identify a gesture in the video, and determining a response time of the touch screen with respect to the gesture.

Other embodiments can include a computer readable storage medium having a set of instructions which, if executed by a processor, cause a computer to receive a video of an interaction with a touch screen. The instructions may also cause a computer to use a computer vision process to identify a gesture in the video, and determine a response time of the touch screen with respect to the gesture.

In addition, embodiments may include a computing system having a non-volatile memory to store a video of an interaction with a touch screen, and a chipset with logic to receive the video. The logic can also use a computer vision process to identify a gesture in the video, and determine a response time of the touch screen with respect to the gesture.

Additionally, embodiments can include a method in which a video of an interaction with a touch screen is received. The method may also provide for using a computer vision process to identify a gesture in the video, and detecting a first display update on the touch screen. In addition, the method can involve determining a response time of the touch screen with respect to the gesture, wherein determining the response time includes counting one or more frames between the gesture and the first display update. Moreover, the method may provide for tracking a display area update percentage subsequent to the first display update, wherein the display area update percentage is tracked on a frame-by-frame basis. Additionally, the method can conduct a frame rate determination for the touch screen based on the display area update percentage, and output the response time and a result of the frame rate determination.

FIG. 1 shows a measurement system 10 that may be used to evaluate a device 12 having a touch screen 14. wherein the device 12 could be a consumer electronics device such as a wireless smart phone, mobile Internet device (MID), tablet, notebook computer, desktop computer, television, etc. Thus, the device 12 might be used to browse web pages, play video games, view programming content, and conduct other user related activities. The touch screen 14 might be used to input data and control the functionality of the device 12, as well as to output information to the user of the device 12. The device 12 may also have other input devices (not shown) such as a mouse, touchpad, keypad, keyboard, and/or microphone.

In the illustrated example, a high speed camera 16 captures a video of the front of the touch screen 14 during various interactions between a robotic arm 15 and the touch screen 14. The camera 16 could be a digital camera capable of recording the touch screen 14 at high enough frame rates and resolutions to extract objective data from the resulting video. For example, a gesture, such as a zoom, pan, rotate or tap operation, could be performed on the device 12 via the touch screen 14, wherein the video captured by the camera 16 may document the visual output of the touch screen 14. Thus, the robotic arm 15 can mimic user gestures/interactions. Alternatively, the gestures may be conducted manually. The illustrated system 10 also includes a computing system 18 having logic 20 to receive the video, use a computer vision process to identify gestures in the video, and determine response times of the touch screen 14 with respect to the gestures, as will be discussed in greater detail. The logic 20 may also track display area update percentages subsequent to responses of the touch screen to gestures, conduct frame rate determinations for the touch screen based on the display area update percentages, and output the response times and results of the frame rate determinations, as will also be discussed in greater detail.

Turning now to FIG. 2A, a method 22 of evaluating response times for a touch screen is shown. The method 22 may be implemented in executable software as a set of logic instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 22 may be written in any combination of one or more programming languages, including an object oriented programming language such as Java, Smalltalk, C++ or the like and conventional procedural programming languages, such as the "C" programming language or similar programming languages. The functionality of the method 22 may also be implemented via proprietary and/or commercially available image/video processing tools such as OpenCV or Matlab.

Illustrated processing block 24 provides for receiving a video of an interaction with a touch screen, wherein a computer vision process may be used at block 26 to identify a gesture in the video. As already noted, the gesture could include a zoom, pan, rotate or tap operation conducted with one or more fingers of a user (or a robotic arm), wherein the computer vision process may be designed to recognize the finger/arm in various different orientations and at different locations on the touch screen. Such computer vision processes are well documented and are not described in detail herein so as not to obscure other aspects of the embodiments. Block 28 may determine the response time of the touch screen with respect to the gesture. As will be discussed in greater detail, in one example, determining the response time may include counting one or more frames between the gesture and a display update on the touch screen.

FIG. 2B shows a method 30 of evaluating frame rates for a touch screen. The method 30 may be implemented in executable software as a set of logic instructions stored in a machine- or computer-readable medium of a memory such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated block 32 provides for tracking a display area update percentage subsequent to a response of the touch screen to a gesture. As will be discussed in greater detail, the display area update percentage can provide a unique solution to the challenge presented by touch screens that do not update entirely at once. Rather, from frame-to-frame, typically only a portion of the display will be updated while the touch screen is responding to the gesture (e.g., panning the display in response to a finger swipe). Thus, tracking the display area update percentage may facilitate a determination of the number of frames encountered, and in turn the average frame rate. Accordingly, block 34 may conduct a frame rate determination for the touch screen based on the display area update percentage.

FIG. 3 shows a more detailed example of a method 36 of evaluating a touch screen. In particular, the method 36 may be used to implement one or more aspects of the method 22 (FIG. 2A) and/or the method 30 (FIG. 2B), already discussed. Block 38 may load a video of an interaction with the touch screen, wherein the first frame of the video can be examined at block 40. Blocks 42, 44 and 46 provide for searching the video on a frame-by-frame basis for a finger (or robotic arm, etc.). As already noted, the search may involve using a computer vision process configured to analyze pixel data and determine whether one or more objects in the pixel data correspond to a finger. If so, illustrated block 48 determines whether the finger has moved since the last frame. Accordingly, the determination at block 48 can involve a comparative analysis between two or more frames in the video content. If movement of the finger is detected, a response time/delay counter may be started at block 50.

Block 52 may advance one frame, wherein the next frame can be examined at block 54. If it is determined at block 56 that the display has not been updated, it may be inferred that the touch screen has not yet responded to the gesture and the frame advance and examination at blocks 52 and 54 can be repeated. If a display update is detected (e.g., by virtue of a significant difference between the pixel data of successive frames), illustrated block 58 stops the response delay counter and reports the value of the counter as the response time for the touch screen.

Block 60 may provide for calculating a display area update percentage and resetting a "no motion" counter. As already noted, the display area update percentage can enable a particularly useful approach to frame rate calculation. With regard to the no motion counter, it may be noted that display area updates could be conducted relatively slowly depending upon the hardware and/or software configuration of the touch screen device. Thus, simply advancing one frame as in block 62, examining the frame as in block 64, and determining whether another display update has taken place as in block 66, might yield "false negatives" with regard to the video content containing motion. The no motion counter may therefore be used in conjunction with a threshold to trigger the frame rate determination. In particular, if it is determined at block 66 that a display update has not occurred, then the no motion counter can be incremented at block 68 and compared to the threshold at block 70. The threshold, which may be set based on experimental or other data, can take into consideration device latencies that may cause the touch screen to appear as though it is done responding to the gesture. Thus, if the threshold is not exceeded, another frame advance may be conducted at block 62 and the frame rate determination is effectively deferred. Otherwise, illustrated block 72 provides for outputting the number of observed frames and the average frame rate.

Of particular note is that if it is determined at block 66 that the display has been updated, another display area update percentage calculation can be conducted at block 60. For example, if 25% of the display area is updated each time a display update is detected, and one hundred display updates are detected, block 60 may determine that twenty-five frames have been observed (e.g., twenty-five times one hundred). Accordingly, block 72 may use the number of frames that have been observed and knowledge of the amount of time that has expired to determine the average frame rate for the touch screen.

Figure 4:
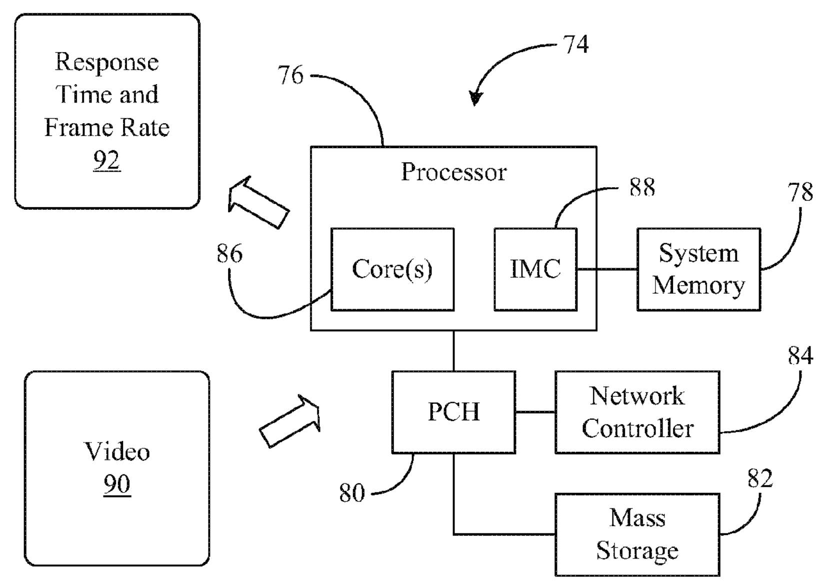
FIG. 4 is a block diagram of an example of a computing system according to an embodiment.

FIG. 4 shows a computing system 74 having a processor 76, system memory 78, a platform controller hub (PCH) 80, mass storage (e.g., hard disk drive/HDD, optical disk, flash memory) 82, a network controller 84, and various other controllers (not shown). The computing system 74 could be readily substituted for the computing system 18 (FIG. 1), already discussed. The platform 74 could be part of a mobile platform such as a laptop, personal digital assistant (PDA), mobile Internet device (MID), wireless smart phone, etc., or any combination thereof. In addition, the platform 74 may also he part of a fixed platform such as a personal computer (PC), server, workstation, etc. Thus, the processor 76 may include one or more processor cores 86 capable of executing a set of stored logic instructions, and an integrated memory controller (IMC) 88 configured to communicate with the system memory 78. The system memory 78 could include dynamic random access memory (DRAM) configured as a memory module such as a dual inline memory module (DIMM), a small outline DIMM (SODIMM), etc.

The illustrated PCH 80, sometimes referred to as a Southbridge of a chipset, functions as a host device and may communicate with the network controller 84, which could provide off-platform wireless communication functionality for a wide variety of purposes such as cellular telephone (e.g., Wideband Code Division Multiple Access/W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LR-WPAN (Low-Rate Wireless Personal Area Network, e.g., IEEE 802.15.4-2006), Bluetooth (e.g., IEEE 802.15.1-2005, Wireless Personal Area Networks), WiMax (e.g., IEEE 802.16-2004, LAN/MAN Broadband Wireless LANS), GPS (Global Positioning System), spread spectrum (e.g., 900 MHz), and other RF (radio frequency) telephony purposes. The network controller 84 may also provide off-platform wired communication (e.g., RS-232 (Electronic Industries Alliance/ETA), Ethernet (e.g., IEEE 802.3-2005), power line communication (e.g., X10, IEEE P1675), USB (e.g., Universal Serial Bus, e.g., USB Specification 3.0, Rev. 1.0, Nov. 12, 2008, USB Implementers Forum), DSL (digital subscriber line), cable modem, T1 connection, etc., functionality.

The PCH 80 may also be coupled to a robotic arm 15 (FIG. 1) in order to facilitate the approximation of various gestures. In such a case, the processor 76 might instruct the robotic arm 15 (FIG. I) to conduct various touch operations including, but not limited to, zoom, pan, rotate and/or tap operations on the display or other input component of the device.

In the illustrated example, the processor 76 may execute logic that receives a video 90 of an interaction with a touch screen from, for example, non-volatile memory such as the mass storage 82, the network controller 84 or other appropriate video source. The logic may also use a computer vision process to identify a gesture in the video, and determine a response time of the touch screen with respect to the gesture. In one example, the logic can track a display area update percentage subsequent to a response of the touch screen to the gesture, and conduct a flame rate determination for the touch screen based on the display area update percentage. The logic may also be configured to output the response time and frame rate 92 via, for example, a display (not shown) of the system 74.

Techniques described herein may therefore provide for automated, non-intrusive extraction of parameters of perceptual models for a wide variety of user scenarios and touch screen devices. Accordingly, accuracy challenges associated with manual extraction of parameters may be obviated through the use of a solution that is readily scalable and easily integrated into an overall automation framework of experience evaluation.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:

receiving a video of a user interaction with a touch screen;

using a computer vision process to identify a gesture in the video;

detecting a first display update on the touch screen;

determining a response time of the touch screen with respect to the gesture, wherein determining the response time includes counting one or more frames between the gesture and the first display update;

tracking a display area update percentage subsequent to the first display update, wherein the display area update percentage is tracked on a frame-by-frame basis;

conducting a frame rate determination for the touch screen based on the display area percentage update; and outputting the response time and a result of the frame rate determination.

2. The method of claim 1, further including deferring the frame rate determination if a second display update has occurred on the touch screen.

3. The method of claim 2, further including using a no motion counter and a threshold to trigger the frame rate determination.

4. The method of claim 2, further including detecting the second display update, wherein the first display update and the second display update are detected on a frame-by-frame basis.

5. A computing system comprising:

a non-volatile memory to store a video of a user interaction with a touch screen; and a chipset including logic to, receive the video, use a computer vision process to identify a gesture in the video, determine a response time of the touch screen with respect to the gesture, track a display area update percentage subsequent to a response of the touch screen to the gesture, conduct a frame rate determination for the touch screen based on the display area update percentage, and output the response time and a result of the frame rate determination.

6. The system of claim 5, wherein the logic is to count one or more frames between the gesture and a first display output on the touch screen.

7. The system of claim 6, wherein the logic is to detect the first display output on a frame-by-frame basis.

8. The system of claim 5, wherein the display area update percentage is to be tracked on a frame-by-frame basis.

9. The system of claim 5, wherein the logic is to defer the frame rate determination if a second display update has occurred on the touch screen.

10. The system of claim 9, wherein the logic is to use a no motion counter and a threshold to trigger the frame rate determination.

11. The system of claim 9, wherein the logic is to detect the second display update on a frame-by-frame basis.

12. A non-transitory computer readable storage medium comprising a set of instructions which, if executed by a processor, cause a computer to:

receive a video of a user interaction with a touch screen;

use a computer vision process to identify a gesture in the video;

determine a response time of the touch screen with respect to the gesture;

track a display area update percentage subsequent to a response of the touch screen to the gesture;

conduct a frame rate determination for the touch screen based on the display area update percentage; and output the response time and a result of the frame rate determination.

13. The medium of claim 12, wherein the instructions, if executed, cause a computer to count one or more frames between the gesture and a first display update on the touch screen.

14. The medium of claim 13, wherein the instructions, if executed, cause a computer to detect the first display update on a frame-by-frame basis.

15. The medium of claim 12, wherein the display area update percentage is to be tracked on a frame-by-frame basis.

16. The medium of claim 12, wherein the instructions, if executed, cause a computer to defer the frame rate determination if a second display update has occurred on the touch screen.

17. The medium of claim 16, wherein the instructions, if executed, cause a computer to use a no motion counter and a threshold to trigger the frame rate determination.

18. The medium of claim 16, wherein the instructions, if executed, cause a computer to detect the second display update on a frame-by-frame basis.

19. A method comprising:

receiving a video of a user interaction with a touch screen;

using a computer vision process to identify a gesture in the video;

determining a response time of the touch screen with respect to the gesture;

tracking a display area update percentage subsequent to a response of the touch screen to the gesture;

conducting a frame rate determination for the touch screen based on the display area update percentage; and outputting the response time and a result of the frame rate determination.

20. The method of claim 19, wherein determining the response time includes counting one or more frames between the gesture and a first display update on the touch screen.

21. The method of claim 20, further including detecting the first display update on a frame-by-frame basis.

22. The method of claim 19, wherein the display area update percentage is tracked on a frame-by-frame basis.

23. The method of claim 19, further including deferring the frame rate determination if a second display update has occurred on the touch screen.

24. The method of claim 23, further including using a no motion counter and a threshold to trigger the frame rate determination.

25. The method of claim 23, further including detecting the second display update on a frame-by-frame basis.

* * * * *